3,570,310
FLOW-INDICATING DEVICE
Wesley M. Densmore, Brownfield, Tex., assignor to Cities Service Oil Company, Tulsa, Okla.
Filed Apr. 24, 1969, Ser. No. 819,047
Int. Cl. G01p 5/00
U.S. Cl. 73—204     4 Claims

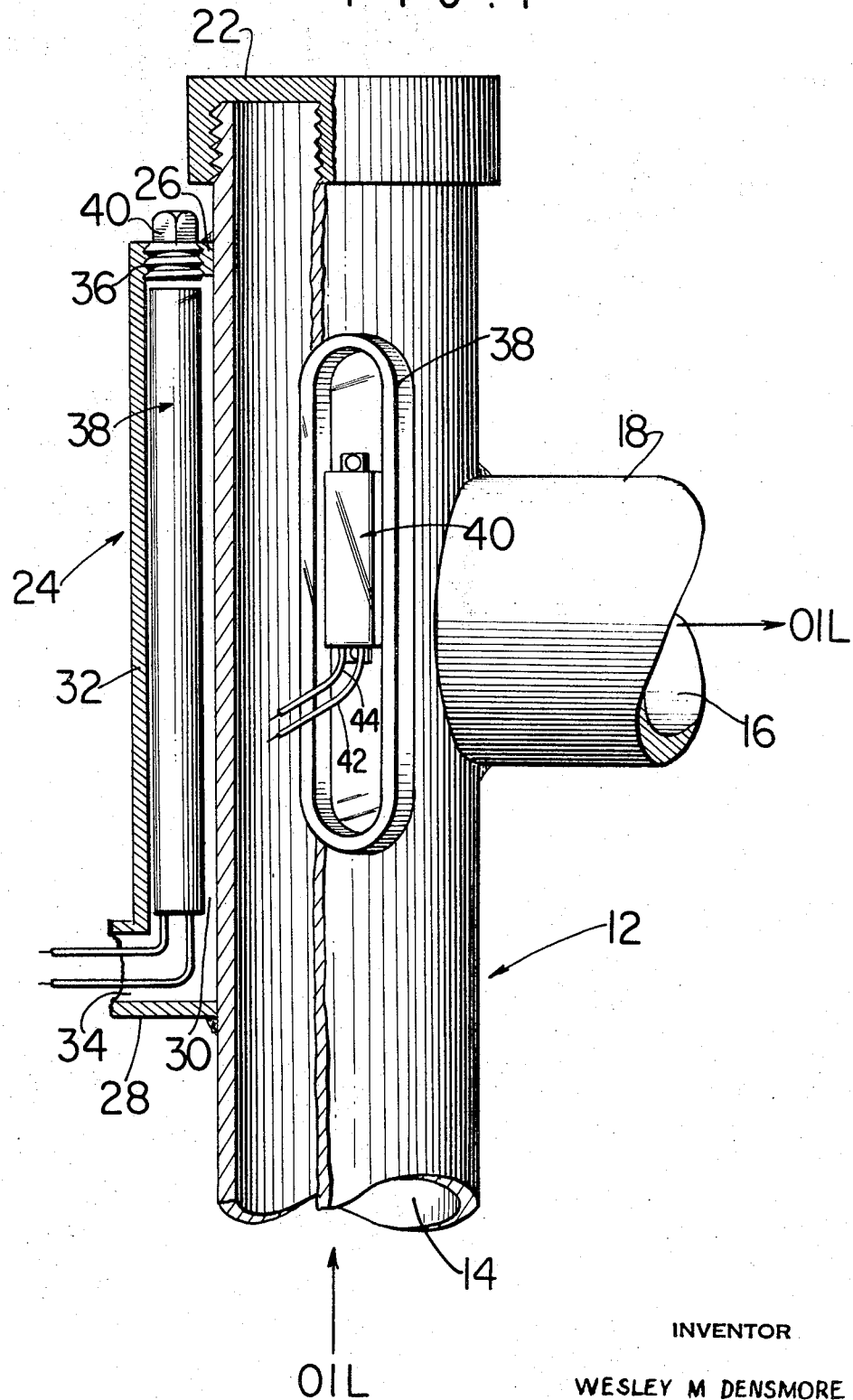

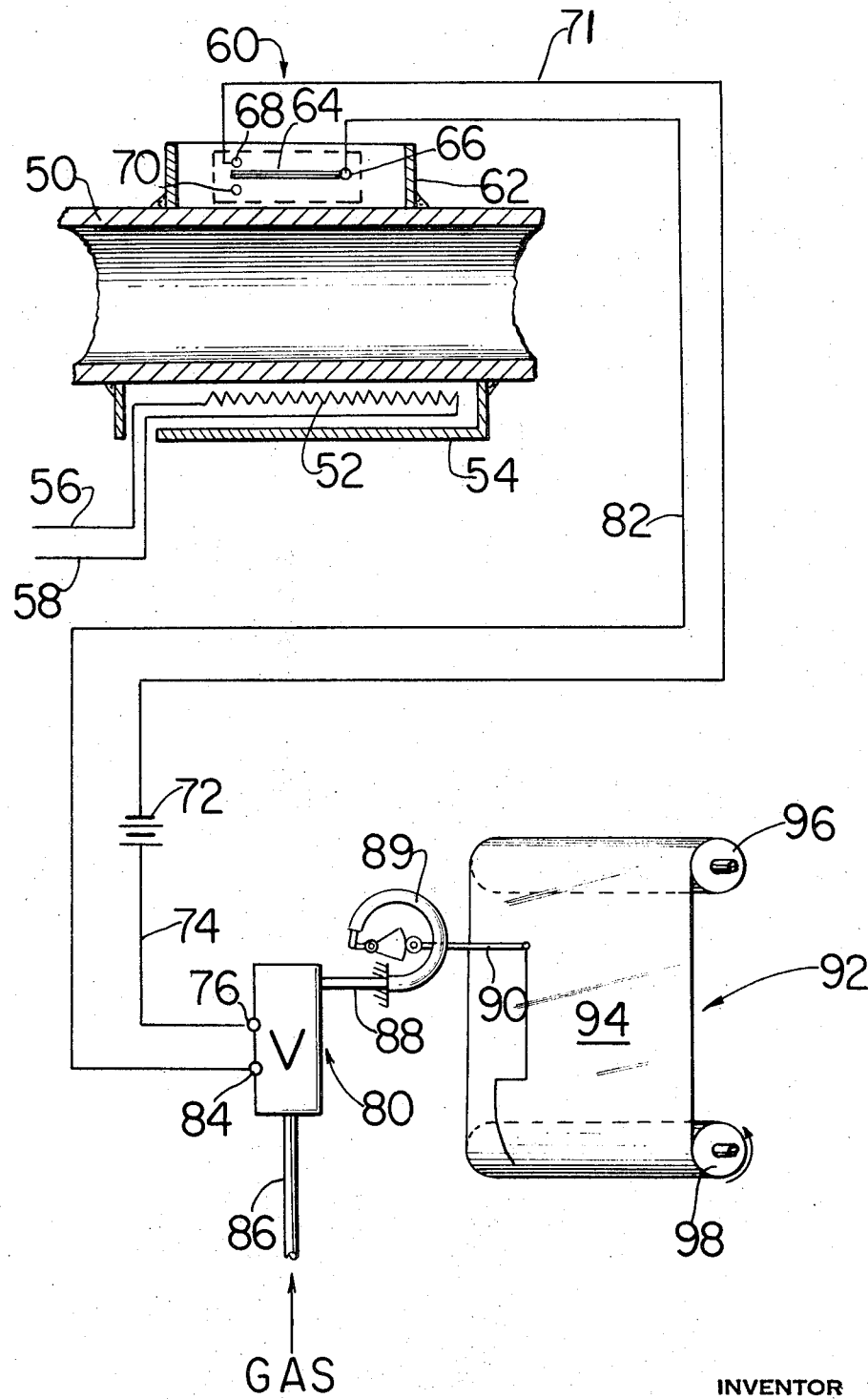

ABSTRACT OF THE DISCLOSURE

An apparatus for sensing fluid flow or the lack of same in a conduit is disclosed herein. The apparatus comprises a fluid flow conduit made of a heat conducting material such as brass, an electrical heater mounted in thermal contact on the outside of the conduit, and an electrical switch responsive to changes in temperature mounted on the conduit, whereby an increase in the temperature of the conduit causes the electrical switch to trip. The switch is connected to an indicating and recording device such as a chart which shows the amount of time that it is switched to the high temperature level and vice versa. In operation the electrical heater heats the metal conduit and the fluid flowing through the conduit carries away the heat establishing a conduit temperature which is indicative of a flow through the conduit. If no flow occurs in the conduits, the conduit rapidly heats up to a higher temperature level and causes the temperature sensing switch to trip, remotely indicating to the recording device that the switch is in the no-flow position.

BACKGROUND OF THE INVENTION

This invention relates to a device for indicating the flow or lack of flow of a fluid through a conduit. More particularly, this invention is directed to an apparatus which remotely indicates the flow or lack of flow of crude oil through a pipe.

Devices for measuring the flow or lack of it in producing wells have been in use for quite some time. Besides aiding in determining the continuing production of a particular oil producing well, these devices are of importance in controlling the production where necessary under the various state proration laws. The devices have generally been mechanical flow apparatus which, due to the nature of the fluid measured, are subject to numerous malfunctions and to relatively rapid destruction. This is so because not only do crude oils contain hydrocarbon constituents but also the crude may be highly corrosive, e.g., contain salt water and various inclusions such as sand, clay and other foreign bodies. All this tends to either clog the mechanical measuring device, causes it to rapidly corrode and in a relatively short time result in both the malfunction and eventual destruction of the device, requiring either replacement or a thorough overhaul job. It has therefore become extremely advantageous to develop a no-flow indicating device which would be relatively cheap, very reliable particularly as compared to prior art devices, and not easily susceptible to damage by the fluid from the producing well.

SUMMARY OF THE INVENTION

Accordingly, I have invented a device for sensing fluid flow in a conduit, comprising heating means mounted on the outside of said conduit and in thermal contact with the conduit for applying heat to the conduit body, and flow indicating means mounted on the conduit and in thermal contact with the conduit and responsive to changes in temperature of the conduit whereby an increase in the temperature of the conduit causes the flow indicating means to remotely indicate the change in temperature, thereby indicating the lack of flow in the conduit.

It is therefore an object of this invention to provide a device for sensing the flow or lack of flow in a conduit.

It is a further object of this invention to provide a remote indicating means for determining the flow or lack of flow of crude oil in a pipe, and to indicate the duration of both flow conditions.

Other objects and advantages of this invention will become apparent to those skilled in the art from the description of the drawings and the preferred embodiments which follow.

DESCRIPTION OF THE DRAWINGS

FIG. 1 is an elevation showing a flow indicating apparatus operating according to the present invention in partially cut-away view;

FIG. 2 is a schematic drawing showing the apparatus of this invention connected to a flow recording device.

BRIEF DESCRIPTION OF THE PREFERRED EMBODIMENTS

Referring now to FIG. 1 of the drawings, the flow, no flow apparatus of this invention is shown in one preferred embodiment. A brass T conduit 12 having an inlet 14 at an open end of the T and an outlet 16 at the end of the conduit base leg 18, is inserted in a crude oil flow pipe, not shown. The opposite end of the T conduit 12 is closed off by a cap 22 which is threadedly secured around the closed end of the T. The base leg outlet 16 is connected to the downstream side of the crude oil flow pipe, also not shown. Attached to the outside of the T portion of the no-flow device opposite the base leg 18 of the device is a heater enclosure 24 which is rectangular in shape and extends along the T. The enclosure 24 is formed from a single rectangularly shaped metallic body which is open on the side adjacent the T conduit 12 and is securely attached by brazing or welding of each of its four sides (adjacent the open side) to the outside surface of the conduit. The heater enclosure has two short sides 26 and 28, each joined respectively, to the receptacle long sides, of which only one, 30, is visible and have a top 32 securely attached formed along the top of the receptacle. A port 34 is located in the lower end of the top 32 of the heater receptacle 30. A second access opening 36 is located in the short side 26 of the receptacle and is used as an access hole to insert a heater 38 in the receptacle. A plug 40 is threadedly inserted into the access opening to close it after insertion of the heater. A cylindrical electrical heater 38 having an outside diameter which is slightly smaller than the inside of the heater receptacle 30 is inserted in the space enclosed by the receptacle and the outside surface of the conduit and is in functional thermal contact with the outside metallic surface of the conduit. Two electrical conductive leads 42 and 44 are attached to the end of the electrical heater 38 and through the port 34 in the enclosure to an electrical power source, not shown.

Also attached (by brazing) to the outside of the conduit 14 and approximately midway between the rectangular receptacle 30 and the base leg 18 of the conduit is an elliptically shaped electrical receptacle 38 having its major axis on a radius about 75° away from the radius drawn to the heater receptacle 30. Mounted within the electrical receptacle 38 is an electrical temperature sensing means 40 which is securely attached to the outside surface of the conduit. The temperature sensing device may be any suitable component applicable to this function. Examples of suitable temperature sensing devices are thermostats, thermistors, and thermocouples, all of course incorporated with applicable circuitry for achieving their function. A preferred temperature sensing device is a thermostat which upon reaching a pre-set temperature switches from one indicating position to a second indicating position. Two leads 42 and 44 are shown extending from the electrical temperature sensing device to suitable circuitry for translating the change in temperature of the conduit to a visual indication. The receptacle 38 is normally covered during use by a plate, not shown.

With a view to more clearly describing the operation of the apparatus of this invention, reference is now made to FIG. 2 of the drawings, wherein the apparatus is shown in schematic form connected to a remotely located indicator. A flow conduit 50 constructed of a thermally conductive metal such as brass, aluminum, or of any other suitably conductive metal including iron, various grades of steel, stainless steel, etc., is connected in the line of a petroleum oil producing well, not shown. An electrical resistance heater 52 is securely mounted to the bottom of the conduit 50 and is shown mounted in an enclosure 54 similar to the heater enclosure 24 shown in FIG. 1 of the drawings. Two electrical conducting leads 56 and 58 are connected to the electrical resistance heater 52 and serve to bring electrical power from a source, not shown to the heater. The electrical heater is therefore mounted in thermal contact with the conduit 50. Also mounted in thermal contact with the conduit 50 and shown at the top of the conduit is an electrical thermostatic switch 60. The switch is securely attached to the outside surface of the conduit 50 by any suitable means including most preferably removable attachments such as screws. The switch is located in a suitable enclosure 62 such as is shown as electrical receptacle 38 in FIG. 1 of the drawings. The thermostatic switch 60 is shown as having a bimetallic switch element 64 which is connected to one pivoted switch point 66 and is built so as to move between switch points 68 and 70. The thermostatic switch, it should be understood, can be any suitable switch which is responsive to change in temperature so as to move at a certain predetermined temperature point between one switch point and another switch point. Switch point 68 is connected to an electrical lead 70 which is connected at its other end to an electrical power source 72. A lead 74 from the power source 72 goes to one terminal 76 of a gas solenoid valve 80. Switch point 66, connected to the pivoted end of the bimetallic switch element 64, is connected to another electrical lead 82 which uninterruptedly extends to another terminal 84 on the gas solenoid valve 80. A pressurized gas supply pipe 86 is connected to the solenoid valve 80. Another pipe 88 connected to the outlet of the solenoid valve 80, is connected to a bourdon-type gauge 89 which controls a movable pen 90. The pen 90 is mounted so as to mark a visible line on a chart recorder 92. For illustrative purposes, the chart recorder 92 is shown as a reel of paper 94 mounted on a feed roll 96 and extending down past the pen 90 to a take-up reel 98. Take-up reel 98 is rotatably driven by a constant speed electrical motor, not shown, so that the paper 92 moves past the pen 90 at a predetermined, fixed rate, the length of paper being proportional to time.

In operation, the electrical heating element 52 which is preferably a 100 watt heater, is continually supplied with electrical power by a source not shown via the electrical leads 56 and 58. These serve to heat up the conduit, which is a brass pipe having an outside diameter of about 2 inches with a wall thickness of about ³⁄₁₆ of an inch, and connected in a crude oil producing line through which approximately one hundred barrels per day of crude oil flows. The thermostatic switch is set so that it contacts open switch point 70 as long as it is below the pre-set temperature at which the switch will indicate no-flow. When there is no crude oil flow in the conduit 50, the thermostatic switch trips after a period which varies from about 2½ minutes to about 5 minutes depending of course on ambient conditions, a relatively cold ambient temperature causing a thermostatic switch after the longer period and logically a relatively warm ambient condition causing the thermostat to trip in a period of 2½ minutes. Upon tripping of the thermostat, the bimetallic switch element moves into contact with switch point 68 causing an electrical flow to actuate the gas solenoid valve 80. This causes the gas solenoid valve to close and consequently the pressure on the bourdon tube is reduced to atmospheric and the pen indicator 90 moved by the bourdon tube to a no-flow indication point on the chart 94. The length of time of no-flow indication is measured by taking off the periods at which the chart indicated a no-flow condition and can be utilized as desired by the operators of the well. Similarly, the pen, chart recorder and the gas solenoid valve could be dispensed with and an accumulator clock be directly connected to leads 74 and 82. The accumulator clock could then be set to send a no-flow signal to the central control point if desired after any pre-set no-flow time, thereby indicating that the well might have ceased flow for an extended period necessitating some sort of attention.

While the temperature sensor has been indicated to be a thermostatic switch, it should of course be understood that other temperature sensing means which can responsively indicate a change in temperature can be used in this invention, such as thermistors and thermocouples with the appropriate circuitry. Similarly with the use of thermistors, the flow of a particular type of crude oil can be determined based on the temperature of the conduit as it changes with the change in flow of the crude oil. This of course would necessitate isolating the conduit from ambient temperature conditions, also calibrating the thermistor for a specific type of crude oil and accordingly would result in a somewhat more complicated device which still operates according to the principles of this invention. It should also be understood that while this particular embodiment of the invention is applied to indicating flow, no-flow in a crude oil producing pipe, such a flow sensing device can be utilized in any media where the flow of fluid to be measured can be calibrated to a particular heat transfer and heat removal rate. The principle and apparatus of this invention may be applied to various apparatus operating on the same inventive principle to measure the flow, lack of flow, and the flow rate of any particular fluid through a pipe.

Having described the invention with reference to a preferred and specific embodiment thereof and wishing to cover those modifications and variations which would be obvious to those skilled in the art without departing from either the spirit or scope of the invention.

I claim:

1. An apparatus for sensing fluid flow through a conduit, comprising a thermally conductive conduit, heating means comprising an electrical heater mounted in thermal contact with said conduit, means for indicating flow mounted in thermal contact with said conduit and at a spaced distance from said electrical heater, said means for indicating flow comprising a thermostatic electrical switch responsive to change in temperature of the conduit, and a marking pen mounted adjacent a moveable chart said pen being responsive to the position of the thermostatic electrical switch thereby being indicative of the temperature of said conduit and visually indicative of fluid flow through the conduit.

2. The apparatus of claim 1 wherein said conduit is made of thermally conductive metals, and said heater and said thermostatic electrical switch are both mounted on the outside of said conduit in spaced relationship to each other.

3. The apparatus of claim 2 wherein said fluid sensed is crude oil produced from a well.

4. The apparatus of claim 1 wherein said marking pen is attached to the movable point of a pressure sensitive bourdon gauge, said bourdon gauge being connected to a gas solenoid valve, said gas solenoid valve being responsively connected to the thermostat to allow pressurized gas to flow through the valve to the bourdon gauge when the thermostat is in the low temperature position indicative of fluid flow through the conduit.

References Cited

UNITED STATES PATENTS

| | | | |
|---|---|---|---|
| 2,729,976 | 1/1956 | Laub | 73—204 |
| 2,946,220 | 7/1960 | Cogniat et al. | 73—196 |
| 3,336,804 | 8/1967 | Poppendiek et al. | 73—204 |
| 3,433,068 | 3/1969 | Werner et al. | 73—204 |
| 3,438,254 | 4/1969 | Seeley | 73—204 |

JAMES J. GILL, Primary Examiner

J. K. LUNSFORD, Assistant Examiner